United States Patent [19]

Trouble et al.

[11] Patent Number: 5,158,738
[45] Date of Patent: Oct. 27, 1992

[54] METHOD OF CONTROLLING A PRESSURIZED WATER NUCLEAR REACTOR

[75] Inventors: Michel Trouble, Saint-Cloud; Jean-Paul Millot, Elancourt; Jean-Luc Leroy, Gif Sur Yvette, all of France

[73] Assignee: Framatome, Courbevoie, France

[21] Appl. No.: 435,883

[22] Filed: Nov. 14, 1989

[30] Foreign Application Priority Data

Nov. 14, 1988 [FR] France .................. 88 14771

[51] Int. Cl.$^5$ .................. G21C 7/00; G21D 3/10
[52] U.S. Cl. .................. 376/217
[58] Field of Search .................. 376/217, 216, 215, 259, 376/254

[56] References Cited

U.S. PATENT DOCUMENTS 4,222,822  9/1980  Mueller et al. .................. 376/217
4,927,594  5/1990  Heibel et al. .................. 376/259

Primary Examiner—Daniel D. Wasil
Attorney, Agent, or Firm—Pollock, VandeSande & Priddy

[57] ABSTRACT

A method is disclosed for controlling a PWR comprising a plurality of control bars selectively and individually positioned in the reactor core. The current value of an operating parameter indicative of the power level (for instance the average temperature of the core) is measured as well as the current positions of the control bars and the axial power offset in the core. When the difference between the current value of the operating parameter and the set value exceeds a predetermined deadband interval or the axial power offset in the core exceeds a reference value, the amount by which the reactivity of the core should be modified is computed. Through a simulation process on a model of said reactor, it is determined which ones of the bars may be moved and which are the amounts of travel to be given to the bars for bringing the difference within the deadband and the offset toward the reference value while minimizing a core enthalpy increase factor.

12 Claims, 6 Drawing Sheets

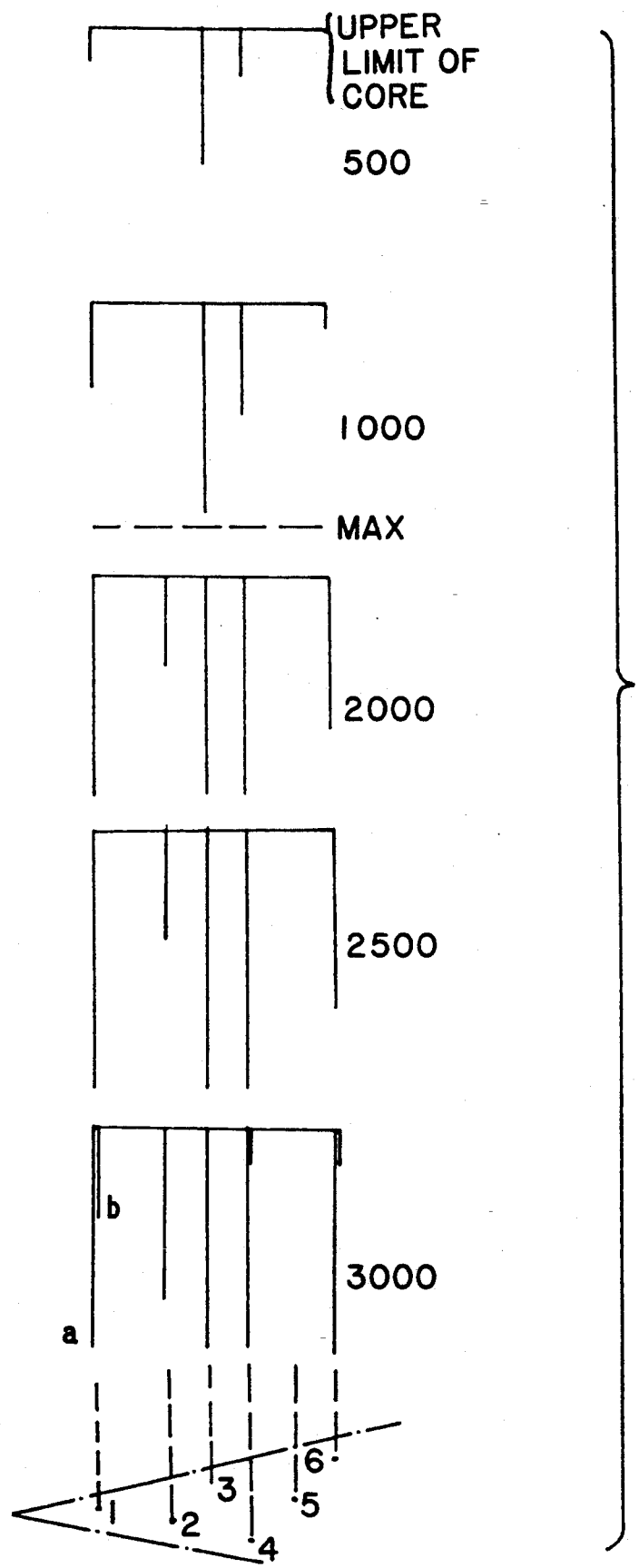

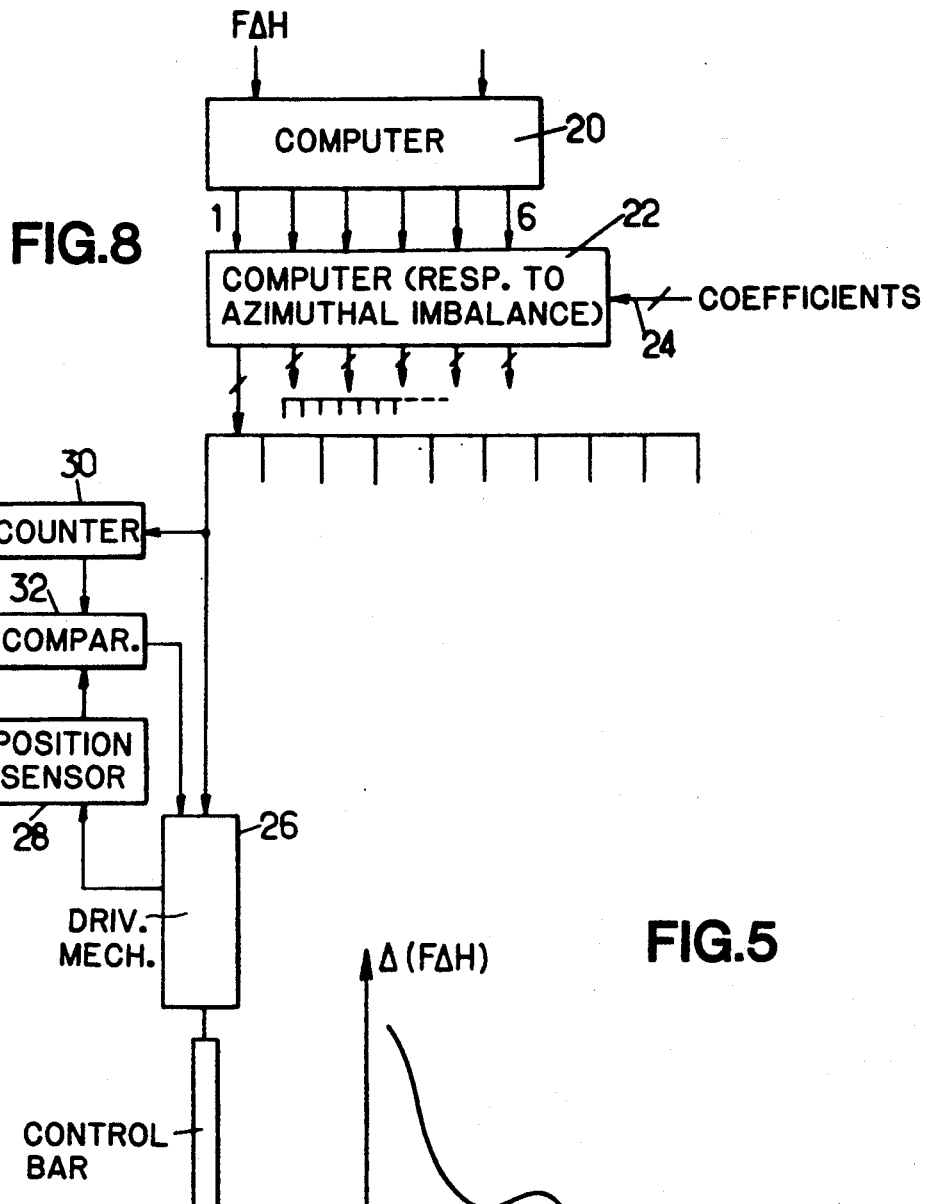

FIG.6

Computation for a desired anti-reactivity: 5 pcm

Repeat
    Repeat
        - Repeat
            - randomly select one cluster amont six
            - randomly select a small displacement between +5 and -15 pcm
            - compute effect on axial offset
        Until the axial offset is fulfilled;
        - compute effect on FDH
        - if FDH decreases
            then OK
            if not - compute $p = \exp(-D(FDH)/kT)$
                      - randomly select any number between 0 and 1: OK / bad
        - if bad
            if too often bad
            then increase kT
    - Until OK
    - if too often OK
        then decrease kT
    - the displacement is accepted
Until the cumulated amounts of displacement result in 5 pcm (within tolerances)

Reposition bars

FIG. 7

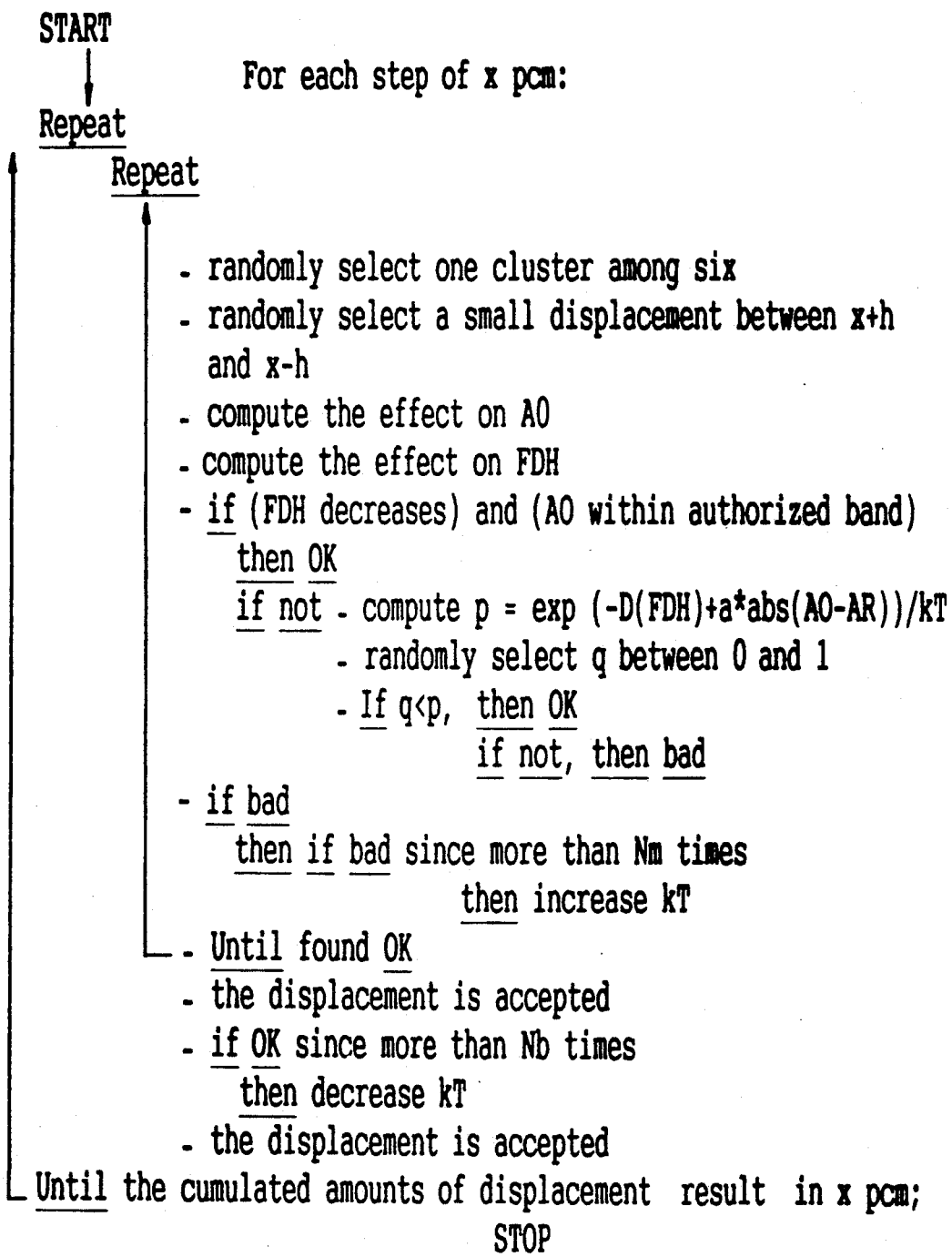

```
START
  |
Repeat
   Repeat              For each step of x pcm:

- randomly select one cluster among six
              - randomly select a small displacement between x+h
                and x-h
              - compute the effect on A0
              - compute the effect on FDH
              - if (FDH decreases) and (A0 within authorized band)
                    then OK
                    if not - compute p = exp (-D(FDH)+a*abs(A0-AR))/kT
                            - randomly select q between 0 and 1
                            - If q<p, then OK
                                      if not, then bad
              - if bad
                    then if bad since more than Nm times
                              then increase kT
         - Until found OK
         - the displacement is accepted
         - if OK since more than Nb times
              then decrease kT
         - the displacement is accepted
Until the cumulated amounts of displacement result in x pcm;
                         STOP
```

METHOD OF CONTROLLING A PRESSURIZED WATER NUCLEAR REACTOR

BACKGROUND OF THE INVENTION

1. Technical Field

The invention relates to a method of controlling a pressurized water nuclear reactor in which control bars in the core are repositioned when a monitoring or operating parameter representative of the difference between the current power of the core and the power demanded (such as the mean temperature of the core) departs from a given range, called "dead band", the repositioned bars being selected so as to avoid increasing any difference between the axial power offset and a reference value; the terms "axial power offset" designate the ratio between the difference of the neutron fluxes in the upper and lower halves of the core and the sum of the fluxes, or designate another parameter representative of the imbalance of the fluxes along the path of travel of the cooling water through the core.

2. Prior Art

A control method of the above-defined type is already known (EP-A-0,051,542 or FR-A-2,493,582). The control bars contain a material which highly absorbs neutrons without giving rise to fissile isotopes (hafnium, for example), in an amount such that the bars have an anti-reactivity or bar worth sufficient for load follow (usually about 1000 pcm when the bars are totally inserted in the core). The bars are generally formed by clusters of rods each having a sheath containing neutron absorbing material pellets.

EP-A-0,051,542 proposes a control law as follows:

if the operating parameter is outside the dead band, computing the direction and displacement speed to be given to a group of bars selected responsive to the axial offset (to avoid increasing the differential between the latter and the reference value) as a function of the value and of the sign of the operating parameter;

if the operating parameter is within the dead band, repositioning a group of bars to reduce the axial offset, only if the difference between the current value of the latter and the reference value exceeds a predetermined threshold, then compensating for the repositioning by varying the boron concentration.

The prior art method requires the use, in addition to the control bars (and shut-down bars which, in normal operation, are always removed from the core and are inserted to shut down the reactor and keep it shut down) of boron in the form of a compound soluble in the cooling water; the boron content is modified to compensate for the reduction of reactivity, due particularly to the progressive depletion of the fuel, and to greatly increase anti-reactivity in case of a serious accident. The initial boron content must consequently be very high. Often the boron content of the water is also varied to regulate the power of the reactor and more particularly to compensate for variations of the xenon effect, the control clusters being repositioned only to vary reactivity during rapid operating transients.

The use of boron dissolved in the water forming the primary coolant has advantages. The anti-reactivity which it introduces is distributed evenly throughout the core. On the other hand, it also has serious drawbacks. The presence of boron results in an appreciable production of liquid effluents which must be processed with a complex installation. Boric acid corrodes some materials, particularly the zirconium-base alloy sheaths.

Another disadvantage is related to the fact that it would be dangerous to rely solely on injection of boron for shut-down of the reactor in case of a serious incident since, due to its construction, the boron injection system has an appreciable time constant. If soluble boron is used as essential control element, it is nevertheless necessary for the absorbent bars to have sufficient anti-reactivity for an emergency shut-down of the reactor. Load follow-up requires the possibility of rapidly reducing the boron content. That becomes impossible when the boron content for normal operation has been reduced to a low value because of the depletion of the core.

Methods have also been proposed for reducing the maximum boron content required in the water forming the primary coolant and/or the variations in the boron content during operation. According to FR-A-2,547,447, groups of control bars are displaced and, possibly, the boron concentration in the primary circuit is modified when it is necessary to bring the reactor condition from a state $\Phi$ (expressing the actual power and axial distribution of the reactor) to a reference state $\Phi c$, taking into account the results of a calculation. This calculation consists in determining the variation to be given to external parameters (particularly the position of the control clusters and the boron concentration) by an iterative calculation which involves predicting a coupling relation between the external parameters and the state of the reactor, taking into account internal uncontrollable parameters, such as the moderation coefficient. Once the coupling relation has been determined, optimum variations of the external parameters are determined to approximate the reference state $\Phi c$. But FR-A-2,547,447 does not teach how the coupling relation can be determined and seems to take into consideration only the axial power distribution, whereas it is important not to neglect the radial power distribution, and particularly the risk of appearance of power peaks.

Another approach for reducing the required boron concentration variations to compensate fuel depletion, hence the initial boron content, consists in varying the energy spectrum of the neutrons during an operating cycle of the core, starting from an epithermic spectrum. FR-A-2,496,319 relates to such a method, in which "grey" bars, i.e., bars having a moderate neutron absorption, are removed as the core is depleted. The bars are then replaced by water which increases the moderation ratio and shifts the energy spectrum of the neutrons closer to the thermal range. The power of the reactor is controlled by means of "black" bars. To that end, the local neutron flux is measured in several zones of the core with a large number of fixed detectors and a combination of displacements of the bars is chosen which gives the required reactivity variation while disturbing to a minimum the power distribution profile, as a function of the power demanded. This method involves an extremely complex calculation, using data from a very large number of neutron flux detectors placed in the core, and yet this method does not completely overcome the problem of using boron as a soluble compound for controlling the reactor.

Still other methods for controlling nuclear reactors plants are known which attempt to minimize or decrease the difference between the actual axial offset and a prescribed value. Such a method is disclosed in European patent application No. 0,097,488.

SUMMARY OF THE INVENTION

It is an object of the invention to provide a method for controlling a pressurized water reactor, making it possible to follow the load demand variations, typically without modifying the boron content of the water forming the primary coolant, possibly with a zero boron content, as long as the reactor is in normal condition. It is a more specific object to make it possible to maintain both the operating parameter close to its reference value, e.g., by maintaining the mean temperature close to a reference temperature, and the axial power offset close to a reference value, without modifying the soluble boron content under normal operation, even for shut-down at a temperature which may be regarded as "intermediate". It is an ancillary object to avoid disturbing the radial power distribution to arrive at the above results.

To this end, there is provided a method of the above-defined kind—the neutron absorbing control bars having sufficient anti-reactivity or worth compensate for the entire reactivity variations occuring during normal operation of the reactor and in case of an incident requiring emergency shut-down of the reactor as long as the coolant is at or close to its normal operating temperature—wherein: when the operating parameter is outside the dead band and/or when the offset of the axial power distribution exceeds a reference value, a simulation procedure is used for predicting which of the bars are to be displaced to bring said operating parameter and/or said offset back to their normal values while minimizing an enthalpy increase factor in the core, the enthalpy increase being defined as the difference between the value of the enthalpy (binomial function of the temperature) at the outlet of the core and the enthalpy at the inlet of the core, possibly at a prior time, and the enthalpy increase factor being defined as the ratio between the maximum value of the increase and its mean value in the core (or in a predetermined sector of the core).

The operating safety of the reactor requires a redundancy of the means for counteracting the reactivity variations and for shut-down of the neutron reaction in the case of failure of some bars.

In the case of control without boron, this result may in particular be attained by providing:

"black" bars whose purpose is solely to cause shut-down of the reactor and which are completely removed from the core during normal operating conditions, and "grey" control bars, i.e., bars whose individual anti-reactivity is intermediate between that of transparent bars made of a material with low neutron absorption and that of the black bars, having totally independent handling systems.

If the "grey" control bars as a whole have sufficient anti-reactivity or "worth", the redundancy is such that an emergency shut-down remains possible even in the case of a failure of one of the systems of bars.

In the case of a spectrum variation reactor, the sum of the anti-reactivity of the shut-down bars and of the anti-reactivity of the control bars must in addition be sufficient so that, when all these bars are inserted into the core, criticality is avoided even when the temperature of the water forming the coolant has decreased to an intermediate value from the normal operating value. The injection of boron is no longer necessary except for keeping the reactor shutdown when the coolant is cold.

Because a large number of "grey" control bars (generally each having an anti-reactivity substantially half that of the black bars, e.g., 75 pcm instead of 150 pcm) then becomes necessary, it is advantageous to distribute the bars into two sets, each of the bars of one set (or its control mechanism) being coaxial with a bar of the other set (or its control mechanism). Thus, the number of penetrations through the lid of the vessel of the reactor is reduced.

The control method of the invention provides numerous advantages. Because there is no need for much boron in the cooling water during normal operation, the coefficient of reactivity variation as a function of the temperature is always highly negative; this is useful in all accidents tending to increase the temperature of the core. The high anti-reactivity value of the bars means that there is no longer any risk of the reactor becoming critical should there be a break in the steam piping. The production of tritium is reduced. The primary effluents are reduced. The chosen method for predicting the bar (or bars) to be repositioned makes it possible to avoid or attenuate the radial distribution peak factors of the neutron flux, while making "load follow" operation of the reactor possible.

The invention also provides a reactor adapted to be controlled by the above-defined method.

BRIEF DESCRIPTION OF THE DRAWINGS

The invention will be better understood from the following description of a method and a reactor according to an exemplary particular embodiment. The description refers to the accompanying drawings.

FIG. 4 shows a possible distribution of the positions of the control bars, as a function of the inserted reactivity, different from that shown in FIG. 3C;

FIG. 5 is an example of a curve representative of the enthalpy increase factor F$\Delta$H (ratio of the enthalpy rise or increase in the hottest channel to the mean value over all channels) in the hottest assembly of a sector, as a function of $\Delta$H;

FIG. 6 is a general flowchart for implementing the method;

FIG. 7, similar to FIG. 6, shows a modified implementation;

FIG. 8 is a diagram showing yet another modified implementation, reducing the radial imbalances.

DESCRIPTION OF A PREFERRED EMBODIMENT

The example of implementation of the invention which will now be described may be considered as representative of applying the method to a pressurized water power reactor having, for example, a power of 1300 MW, whose core is formed by juxtaposed fuel assemblies of hexagonal cross-section. The general construction of the reactor will not be described here since it may be similar to that of pressurized water reactors now under development, such as that described in EP-A-0,231,710, although the invention is also applicable to a core having a square array of fuel assemblies.

Reference may also be made to European patent application No. 0,097,488, already mentioned, for finding a description of a complete plant incorporating a reactor to which the invention is applicable.

Figure 1:
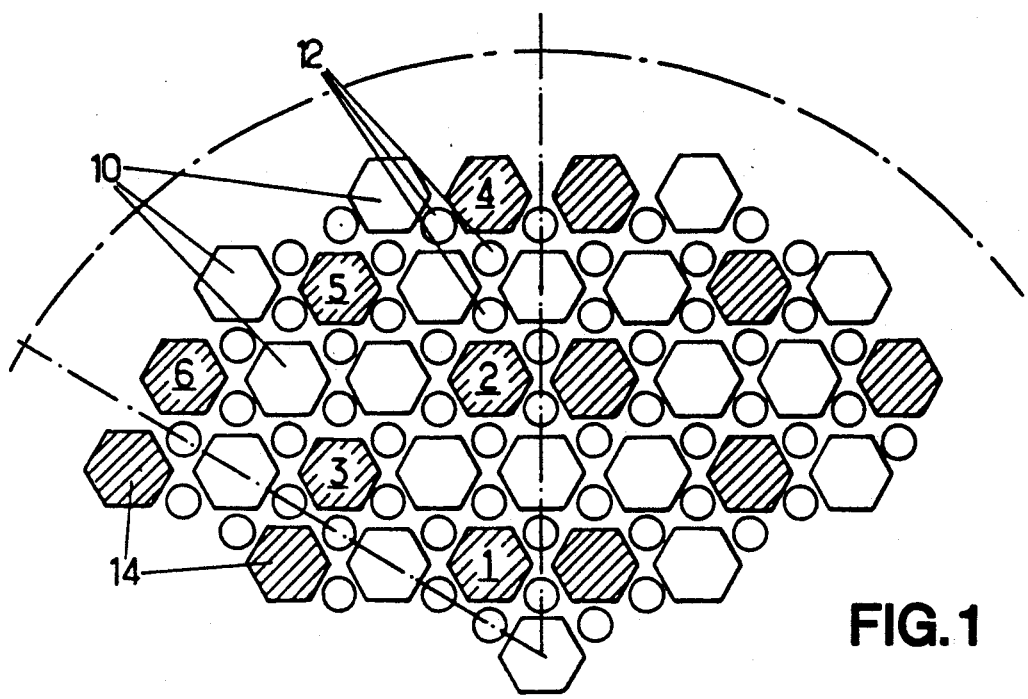
FIG. 1 is a diagram showing the distribution of control bar locations in a fraction of the horizontal cross-section of the core of a typical reactor.

The core may be regarded as comprising six angular sectors all having the same construction and, for that reason, two sectors only are shown completely in FIG. 1.

As shown, each sector comprises thirty-nine fuel assemblies (not counting the central assembly of the core) over each of which is mounted a control bar insertion mechanism. The eight positions 10, shown as white hexagons, are intended to receive shut-down bars, called "black" bars because they have a high neutron absorption or high anti-reactivity worth. The reactor consequently comprises forty-eight shut-down bars in all, sufficient alone for shutting down the reactor when at its normal operating temperature. They are each formed of a cluster of rods for insertion in guide tubes of the corresponding fuel assembly, each rod having a sheath containing pellets of neutron absorbing material. It can be seen that the reactor has, in all, forty-nine shut-down clusters, completely removed from the core (i.e., contained in the upper internals of the reactor) during normal operation of the latter.

Each sector further has twenty fuel assembly locations 12 adapted to receive bars which are removed from the core after an operation period representing a fraction of the total duration of a cycle. The bars provided at the twenty locations 12 contain burnable neutronic poison, whose progressive consumption compensates for depletion of the fuel during an initial operating phase. Such bars are not necessarily all raised simultaneously. Depending on the degree of depletion of the fuel, a first set of bars (clusters of rods) is raised, then a second set of clusters is raised after a shorter or longer period. The sets of clusters are selected so as not to disturb the radial power distribution. The degree of insertion of the consumable poison clusters 12 is independent of fuel management and may be chosen so as to keep the radial power distribution as constant as possible. The method of controlling these clusters may be conventional and will not be described. It should only be mentioned that they also make it possible to modify the neutron energy spectrum: when they are removed from the core, the guide tubes which previously received them are invaded by water, which increases the moderation ratio of the core. This effect of variation of the neutron spectrum towards the lower energies is reinforced if the clusters contain fertile material, as described, for example, in EP-A-0,231,710.

Finally, the positions 14 shown by hatched hexagons in FIG. 1 are intended to receive control bars. These bars are again formed of absorbent rod clusters. To reduce the number of through passages in the lid for controlling the necessary displacements of the bars, it is of advantage to provide two mutually independent bars at each position 14 and to control the two bars with two mechanisms placed coaxially or side by side. Devices are already known for independently moving two control bars occupying a same fuel assembly location in the core. Some arrangements make complete displacement independence possible. More often, for reasons of simplification, the arrangement involves a constraint: one of the two bars, determined by construction, always has a smaller (or at least not a greater) insertion in the core than the other bar (or even may only be lowered when the other is completely inserted in the core).

As shown in FIG. 1, each sector of the core comprises six evenly distributed locations 14, one each for a set of two control bars.

Figure 2:
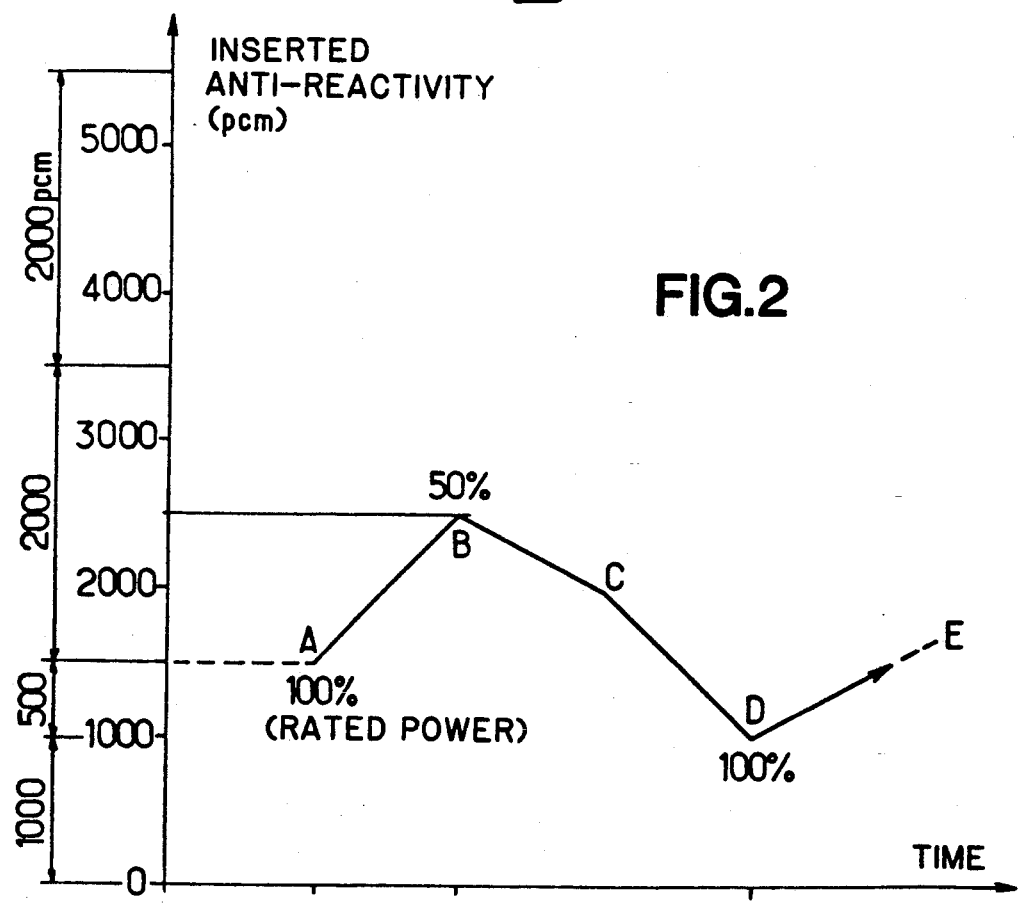
FIG. 2 is a graphical representation of the anti-reactivity to be inserted into a reactor core during a cycle, according to an example.

FIG. 2 illustrates an example of maximum total anti-reactivity variation in the core to be achieved by insertion or removal of the control bars. FIG. 2 corresponds to a case where the total anti-reactivity to be provided is broken down in the following way, for a new core at the beginning of its life:

| | |
|---|---|
| Combustion reserve (after deduction of the effect of the consumable poison): | 1000 pcm |
| | 1000 pcm |
| Control margin: | 500 pcm |
| Power operation margin: | 2000 pcm |
| Compensation of the xenon effect: | 2000 pcm |

The combustion reserve of 1000 pcm, which permits to operate the reactor at 100% of its rated power, is absorbed when the core is new, by the 6×20 consumable poison clusters placed at locations 12. When the core is new, there is no xenon poisoning and then the control clusters situated at locations 14 must supply an anti-reactivity corresponding to the maximum possible amount of xenon poisoning. Consequently, the control clusters must have an anti-reactivity at least equal to 5500 pcm when fully inserted.

FIG. 2 shows, by way of example, a typical evolution likely to take place in time and according to which there is successively:

operation at 100% rated power with xenon saturation (point A);

passage to 50% of the rated power (point B);

steady operation at 50% of rated power (accompanied by a variation of the anti-reactivity due to xenon (point C);

return to 100% of rated power without modification of the xenon content (point D);

progressive decrease of the xenon anti-reactivity (point E).

Figure 3A:
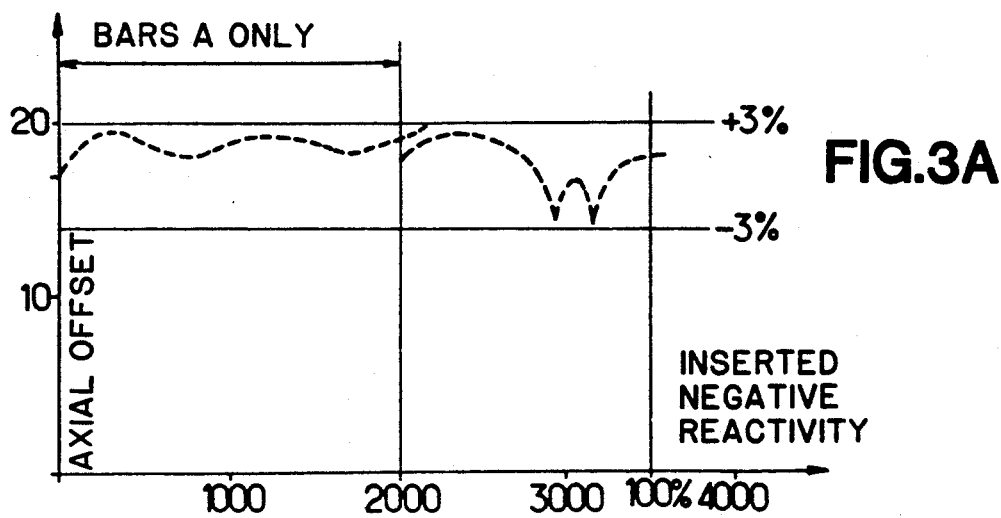
FIGS. 3A, 3B and 3C are diagrams respectively giving examples of variations of the axial power offset, of the enthalpy increase factor F$\Delta$H and of the position of the control bars in one of the six angular sectors of the reactor of FIG. 1, depending on the anti-reactivity to be inserted in the core.
Figure 3B:
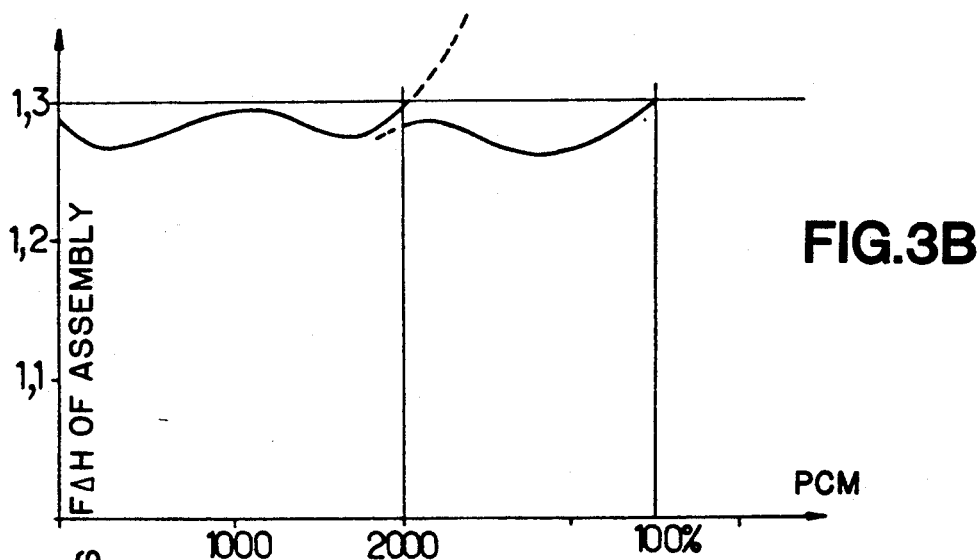
Figure 3C:
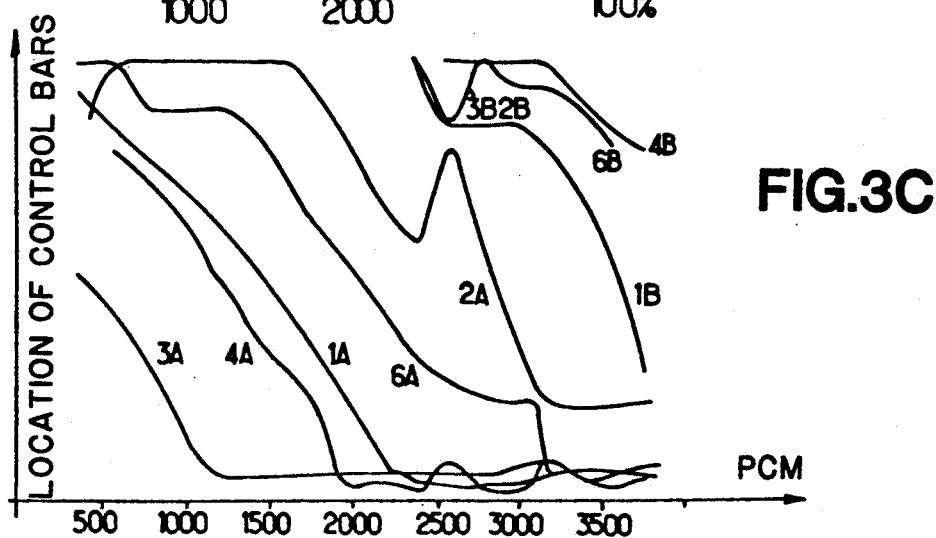

Referring to FIGS. 3A, 3B, 3C, implementation of a control method in accordance with the invention will be described assuming that it aims at maintaining:

a control parameter, formed by the difference between the actual temperature at the outlet of the core and a reference temperature, within a dead range of $+/-3°$ C.;

the difference between the actual axial offset and a reference offset in a range of $+/-3°$ % (FIG. 3A);

the enthalpy increase factor $F\Delta H$ at a value which is minimum and in any case less than 1.3 (FIG. 3B).

The enthalpy increase $\Delta H$ may be calculated either for an individual fuel assembly, or for a fraction of the core, or even for the whole core. For the unit under consideration (fuel assembly, fraction of the core or whole core), the enthalpy increase $\Delta H$ may be calculated from the water inlet and outlet temperatures as a second or third degree polynomial function of the temperatures, depending on the desired accuracy. The inlet and outlet temperatures which are compared are not necessarily those measured at the same time, when it is desired to take into account the transit time of the cooling water in the assembly under consideration.

FIG. 3C shows (assuming that the control process is to be carried out to maintain the axial offset difference or deviation at a value less than +/−3%) possible variations of the anti-reactivity inserted in the core, in a case where the clusters constituting the control bars have the distribution shown in FIG. 1. In FIG. 1, the six control cluster locations are designated by the numbers 1 to 6 also found in FIG. 3C. These numbers are given index a for designating the bars more fully inserted in the core and index b for designating the bars less fully inserted in the core in a set of two bars. It can be seen that only bars a are inserted when the anti-reactivity to be inserted does not exceed 2000 pcm. Beyond this, it is necessary to use bars a and b to maintain the axial offset difference between 17% and 20%: the variations of this difference are then as shown in FIG. 3A. In FIG. 3A, for an anti-reactivity of about 3000 pcm, a discontinuous evolution of the axial deviation difference can be seen, necessary for maintaining the enthalpy increase factor F$\Delta$H at a substantially minimum value and, in any case, less than 1.3 (FIG. 3B).

An example illustrating how the method of the invention may be used to operate a reactor whose core has the construction shown schematically in FIG. 1 will now be described, assuming that control takes place independently for each of six sectors and the conditions to be respected are those already defined in connection with FIGS. 3A and 3B.

For a given reactor, a relation may be defined for each fuel assembly, between the enthalpy increase factor and the position of the bars in the respective sector. In particular, an enthalpy increase factor $E = F\Delta H$ of the hottest fuel assembly may be defined by a relation which is a linear combination of pre-computed "influence functions" $f_{ij}$:

$$E_j = E_{0j} + \Sigma_i f_{ij}) \times (r_i) \quad (1)$$

where:

$E_{0j}$ designates the starting enthalpy increase factor F$\Delta$H;

each of the functions $f_{ij}$ represents the contribution of bar i to $E_j$ for the starting condition $E_{0j}$;

the terms $r_i$ are the anti-reactivity variations caused by displacements of bars i, with i = 1a, 1b, ..., 6b, $E_j$ designates the factor F$\Delta$H after displacements of the clusters causing the variations $r_i$, such clusters being designated hereafter, for the sake of convenience, as 1a, 1b, ..., 6b.

It may be necessary to update the influence functions when the state of the reactor has varied a great deal. A three dimensional in-line power distribution calculation may be used for this purpose.

As mentioned above, the control method according to the invention, reacts to any evolution of the control parameter, i.e., it causes it to depart from the dead band by modifying the position of at least one of the control bars, the amplitude and the direction of displacement of this bar at least being determined so as to:

bring the control parameter back within the dead band, maintain (or bring back) the axial offset difference in the authorized range (FIG. 3A), optimize the enthalpy increase factor.

The first operation to be carried out consists in calculating the reactivity variations necessary for bringing the mean output temperature of the sector back to the reference or set value; then, a simulation procedure is used for selecting a bar (or bars) whose displacement will achieve this variation while optimizing F$\Delta$H.

For this purpose, the strategy shown by the flowchart of FIG. 6 may be adopted. This strategy implies going through several control loops until the difference between the predicted reactivity variation and the necessary variation is less than a given value.

1. The first operation consists in drawing lots for randomly selecting:

one bar from the six, or more generally n, bars of a sector (assuming for the moment that the six mutually corresponding bars in the six sectors will be re-positioned by the same amount);

a displacement among all the displacements (including zero) of such an amplitude that they would cause a reactivity variation within a given range about the required reactivity variation: for example, in the case (illustrated in FIG. 6) of a required variation of −5 pcm, the displacement may be any one of all those which cause a variation between $(-5+10) = +5$ pcm and $(-5-10) = -15$ pcm.

Then it is verified by a computation that the selected displacement does not cause the axial offset difference to depart from the authorized range.

If the condition is not fulfilled, the attempted displacement is waived and lots are again cast for selecting another bar and/or another displacement.

The computation is carried out again and the operations are repeated until the axial distribution conditions are respected.

2. When the axial distribution condition is fulfilled, the evolution (F$\Delta$H) of the enthalpy increase factor caused by the attempted displacement is calculated in accordance with formula (1). If, for example, the initial state is E0, if cluster 2a has been chosen and if the simulated displacement of cluster 2a changes the anti-reactivity from (2a) to (2a mod), a state E1 is obtained for the hottest assembly:

$$E1 = E0 + F_{1a}(1a) + \ldots + f_{2a}(2a \bmod) + \ldots + f_{6b}(6b)$$

a) If $E1 - E0 = \Delta(F\Delta H)$ is negative or zero, the displacement is considered as satisfactory and it is stored.

b) If $\Delta(F\Delta H)$ is positive, a probability P between 0 and 1 is assigned to the displacement, depending on the absolute value of $\Delta(F\Delta H)$:

$$P = exp[-\Delta(F\Delta H)/kT]$$

Probability P is a function derived from Boltzman's law on the distribution of energies as a function of temperature and, for this reason, the constant denominator of the exponential function is designated by kT.

On initialization of the method, kT is given a very high value, so that the negative exponential which represents P has a value close to 1 whatever $\Delta(F\Delta H)$.

Once the value of P has been determined by calculation for the value $\Delta(F\Delta H) = E1 - E0$ to which the attempted displacement leads, any number between 0 and 1 is selected at random; the mean proportion of favorable draws, i.e., of draws between O and P, is equal to probability P.

If the drawing of lots has a positive result, i.e., if the value chosen at random is less than P, value E1 will be considered the rated value.

In the opposite case, the result is not taken into account, i.e., the attempted bar and amount of displacement are abandoned, and another bar and/or another displacement are selected at random, which corresponds to passing through the first loop again in FIG. 6.

When the system is in initial condition with the probability close to 1, almost all numbers drawn by lots between 0 and 1 give a positive result. The method advantageously uses a computing circuit or program which computes the ratio between the number of positive draws and the total number of attempted displacements. If the result is too often favorable (e.g., greater than 90% of the attempts), kT is decreased by a given increment; if, on the other hand, the probability is too low (e.g., less than 70%), kT is increased by the same or another increment; a satisfactory value of P in the long run is about 0.8.

The operation is repeated until a bar and a displacement are selected; the values selected and the corresponding anti-reactivity variation are then stored.

Sometimes, it is necessary to accept repositioning of bars by moving them in a direction which will increase $F\Delta H$: since, in some situations, no displacement will further reduce $F\Delta H$.

Attempting modifications which, a priori, do not seem to go in the right direction, make it possible to cause the system to depart from a secondary minimum of the function (such as those which appear in FIG. 5) to find a better minimum.

3. The simulation process is repeated until the sum of the stored displacements (the number of bars concerned going from 1 to 6 in the case of the example considered, in the same sector) supplies the required reactivity variation, with a predetermined tolerance. All displacements are then carried out by energizing bar actuators.

FIG. 5 shows that, for each fuel assembly, the curve of variation of the enthalpy increase factor $\Delta(F\Delta H)$ as a function of $\Delta H$ has a plurality of successive minima. The method of the invention makes it possible to select displacements toward a minimum, which is not necessarily the lowest possible value of $\Delta(F\Delta H)$.

FIG. 4 shows, by way of example, typical bar arrangements for several inserted anti-reactivities.

Numerous modifications of the flow diagram of FIG. 6 are possible. In particular, the diagram of FIG. 7 may be adopted in which calculation of the expected effect of the repositioning of the clusters on the amount of axial offset is only effected after random selection of bars and displacements which achieve the required anti-reactivity variation with an acceptable effect on $F\Delta H$.

The flow diagram of FIG. 7 will not be described in detail since it is quite similar to that of FIG. 6. The flow diagram corresponds to the case where a first calculation has shown that the total reactivity variation to be obtained is x pcm; a, h, Nm and Np are adjustable parameters whose values are determined beforehand by dimensioning studies. The abbreviations designate:
A0: axial deviation
FDH: enthalpy increase factor
abs: absolute value.

It has been assumed up to now that all the bars belonging to the same group, for example bars 2a in all six sectors, are displaced simultaneously by the same amount after the calculation. This method of operation does not take into account possible azimuthal or radial offsets or imbalances of the power distribution. Such imbalances, of low value, may occur due to mechanical or geometric irregularities or (particularly when the bars are controlled by hydraulic mechanisms which have leaks) due to slow drifts of one or more bars.

Reactors are, as a general rule, provided with thermocouples for measuring the temperature of the pressurized water where it flows out of the individual assemblies and with ion chambers placed outside the core and making it possible to measure the neutron flux. From the measurements delivered by these sensors, the azimuthal imbalances may be calculated with known codes, such as the "PROSPER" code available from the assignee of the present application. The imbalances can be represented by harmonics whose amplitude gives the amount of offset and whose phase makes it possible to determine the central axis of the imbalance. By slightly modifying the degree of insertion of one cluster or of several clusters placed close to the axis of imbalance, the amount of imbalance can be reduced below a tolerance threshold.

FIG. 8 is a diagram showing a method of controlling the bars for attenuating the azimuthal imbalances. In FIG. 8, reference 20 designates a computer for determining, using the algorithms of FIG. 6 or FIG. 7, the displacements to be given to bars belonging to groups 1 to 6 (or 1 to 12 in the case of double bars). Instead of directly applying the control instructions delivered by outputs 1 to 12 (each instruction to all bars of the same group in different sectors), the computer sends the instructions, formed by an amplitude indication and a direction indication, to a circuit 22 which computes the individual displacements to be given to the bars, responsive to an azimuthal imbalance information delivered to inputs 24.

In a simple embodiment, the inputs 24 simply deliver six coefficients for distributing, between the bars of the same group, deviations with respect to the nominal displacement calculated by computer 20 while complying with the condition of maintaining the required anti-reactivity modification unchanged.

In a more elaborate embodiment, input 24 receives a correction coefficient matrix with $6\times 6$ (or $6\times 12$) terms, for improving the result. The matrix of coefficients may be supplied by a separate computer (not shown) using an existing computation code. In this case, circuit 22 must carry out a matrix multiplication of the displacement matrix delivered by computer 20 for the thirty-six (or seventy-two) bars and of the matrix of coefficients.

Whatever the solution adopted, circuit 22 delivers, at thirty-six outputs (in the case of single bars) or seventy-two outputs (in the case of double bars) individual direction and amplitude data which are sent to respective control mechanisms 26.

If the mechanism 26 is hydraulic, it generally comprises a cylinder whose piston supports the bar and a reciprocating hydraulic actuator, each actuation of the actuator displacing the cylinder by one step of predetermined amplitude. Since the cylinder is likely to have leaks which result in a slow downward drift of the bar, a reset system may be provided for compensating the drift. In the embodiment shown in FIG. 8, this system comprises means 28 for detecting the position of the bar when it is at any one of several positions, a counter 30 which receives the energy signals sent to mechanism 26 and works out, from the individual signals, the theoretical or set position of the bar and finally a comparator 32 which is tripped whenever the bar (or its control mechanism) passes in front of a measuring point of the position detection means 28. The comparator computes the difference between the theoretical position, given by counter 30, and the actual position, represented by the respective reference point and which is known by construction. If the difference is greater than one operating step of the actuator and cylinder, comparator 32 sends to the actuator of the bar an "up" order causing a number of steps to be effected for compensating the drift.

Numerous other structural modifications are possible. The number of bars per sector could often be reduced, e.g., by omitting group 5 which is of little use. The use of double clusters, rather than single clusters, is necessary only for power start-up after a shut-down of long duration, sufficient for the xenon content to have decreased. Other parameters could be used, for example for reducing the maximum power per unit length of the fuel rods, taking into account chemical interactions between the sheath of the rods and the fuel pellets.

We claim:

1. Method of controlling a pressurized water nuclear reactor comprising a nuclear reactor and plurality of control bars adapted to be selectively and individually positioned in the reactor core for controlling the reactivity of the core, the negative reactivity provided by said control bars when fully inserted in the core being sufficient for compensating all reactivity variations which may intervene during normal operation of the reactor and upon an incident which requires that the reactor be rendered sub-critical while the pressurized water is at the normal temperature for operation of the reactor, said method comprising the steps of:
    (a) determining: the current value of an operating parameter indicative of the power developped by the reactor core; the current positions of the control bars; and the axial power distribution offset in the core;
    (b) when the difference between said current value of the operating parameter and a set value exceeds a predetermined deadband interval, computing the amount by which the reactivity of the core should be modified;
    (c) determining, through a simulation process on a model of said reactor, which ones of the control bars may be moved and predicted amounts of displacement to be given to said ones of the bars for bringing back said difference within said deadband without modifying said axial power distribution offset out of a reference range and while minimizing a core enthalpy increase factor; and
    (d) moving said ones of said bars by said amounts of movement.

2. Method of controlling a pressurized water nuclear reactor comprising a nuclear reactor and a plurality of control bars adapted to be selectively and individually positioned in the reactor core for controlling the reactivity of the core,
    comprising the steps of:
    (a) measuring the current value of an operating parameter indicative of the power developped by the reactor core, the current positions of the control bars and the axial power distribution offset in the core,
    (b) when the difference between said current value of the operating parameter and a set value exceeds a predetermined deadband interval, computing the amount by which the reactivity of the core should be modified and the change in the negative reactivity provided by said control bars which is necessary for decreasing said difference to zero,
    (c) randomly selecting at least one bar within the core or within a sector of the core and simulating changes in negative reactivity to be expected from a plurality of assumed amounts of movement of said at least one bar, said assumed amounts of movement having an average value substantially equal to the amount of movement which would result in the necessary negative reactivity change,
    (d) computing the predicted variation of the axial power distribution offset which would result from each of said assumed movements and determining whether said predicted variation results in an axial power distribution offset exceeding a predetermined reference value,
    (e) if said predetermined reference value is exceeded, repeating steps (c) and (d) until the variation of axial power distribution offset does not result in a power axial offset exceeding said predetermined reference value,
    (f) computing the variation of an enthalpy elevation factor of the core resulting from the simulated amount of movement,
    (g) storing the simulated amount of movement of said at least one bar if said simulated amount of movement decreases the enthalpy factor, while storing or omitting to store said simulated amount of movement with a probability which is responsive to the degree of said variation if said simulated amount of movement increases the enthalpy factor,
    (h) repeating steps (b)–(g) until the accumulated negative reactivity change due to the stored amount of movement is equal to the necessary change, with a permissible deviation, and
    (i) moving said at least one bar by said stored amounts of movement.

3. Method according to claim 2, wherein the variation in the axial power distribution offset is computed after said at least one bar and the amount of displacement to be given to said at least one bar have been stored.

4. Method according to claim 2, wherein said probability is computed as:

$$P = exp[\Delta(F\Delta H)/kT]$$

where $(F\Delta H)$ is the enthalpy increase factor, and
    $kT$ is a constant value which is greater than the maximum value of $\Delta(F\Delta H)$ by at least one order of magnitude.

5. Method according to claim 4, wherein $kT$ is initially given a value which leads to a probability which is close to 1 and is progressively decreased as long as the probability retains an average value which is higher than a predetermined value.

6. Method according to claim 2, further comprising fractionating said core into a plurality of virtual angular sectors all having the same arrangement, wherein all control bars having the same positions in all sectors are simultaneously moved by the same extent.

7. Method according to claim 6, wherein said bars having the same positions in the different angular sectors are moved by the same extent.

8. Method according to claim 6, wherein said bars having the same positions in the different angular sectors are moved by different extents and the different extents are selected by applying a correction about an average value which compensates for radial power offsets.

9. Method according to claim 2, wherein the reactor is maintained in sub-critical condition after it has been shut-down with additional bars each having a neutron absorption which is approximately double that of a control bar.

10. Method according to claim 2, comprising the additional step of modifying the neutron energy spectrum by progressively removing bars which contain burnable poison from the core.

11. Method according to claim 2, wherein said control bars are distributed in pairs, the two bars of a same pair being at a same location in the core.

12. Method of controlling a pressurized water nuclear reactor comprising a nuclear reactor and a plurality of control clusters adapted to be selectively and individually positioned in the reactor core for controlling the reactivity of the core, the negative reactivity provided by said control clusters when fully inserted in the core being sufficient for compensating all reactivity variations which may intervene in normal operation of the reactor and upon an incident which requires that the reactor be rendered sub-critical while the pressurized water is at the normal temperature for operation of the reactor, comprising the steps of:
(a) determining: the current value of an operating parameter indicative of the power developped by the reactor core; the current positions of the control clusters; and the axial power distribution offset in the core;
(b) when the difference between said current value of the operating parameter and a set value exceeds a predetermined deadband interval computing the amount by which the reactivity of the core should be modified;
(c) determining, through a simulation process on a model of said reactor, which ones of the control clusters may be moved and predicted amounts of displacement to be given to said ones of the bars for bringing back said difference within said deadband while minimizing a core enthalpy increase factor;
(d) after determining each said predicted amount of displacement computing the resulting axial offset, verifying that the predicted amount of displacement does not cause the axial offset difference to move out of a predetermined reference range, discarding the predicted displacement if it exceeds in the affirmative and retaining the predicted amount of displacement in the negative; and
(e) moving said ones of said clusters by said amounts of movement.

* * * * *